US008869774B2

(12) United States Patent
Sasaki et al.

(10) Patent No.: US 8,869,774 B2
(45) Date of Patent: Oct. 28, 2014

(54) SMALL ENGINE AND ENGINE WORK MACHINE INCLUDING THE SAME

(75) Inventors: Toshihide Sasaki, Hitachinaka (JP); Shigetoshi Ishida, Hitachinaka (JP); Hiroki Nagase, Sambu-gun (JP)

(73) Assignee: Hitachi Koki Co., Ltd., Tokyo (JP)

(*) Notice: Subject to any disclaimer, the term of this patent is extended or adjusted under 35 U.S.C. 154(b) by 152 days.

(21) Appl. No.: 13/155,294

(22) Filed: Jun. 7, 2011

(65) Prior Publication Data

US 2012/0111303 A1 May 10, 2012

(30) Foreign Application Priority Data

Jun. 8, 2010 (JP) ................................ P2010-130796
Jun. 8, 2010 (JP) ................................ P2010-130797

(51) Int. Cl.
*F02D 11/10* (2006.01)
*F02M 35/10* (2006.01)
*F02B 27/00* (2006.01)
*F02D 35/00* (2006.01)
*F02B 63/02* (2006.01)
*F02B 75/02* (2006.01)

(52) U.S. Cl.
CPC ...... *F02M 35/10275* (2013.01); *F02D 2400/06* (2013.01); *F02B 63/02* (2013.01); *F02B 2075/025* (2013.01); *Y02T 10/146* (2013.01); *F02D 11/10* (2013.01); *F02B 27/003* (2013.01); *F02D 35/0053* (2013.01); *F02D 2400/04* (2013.01)
USPC ............................ 123/399; 123/403; 123/361

(58) Field of Classification Search
USPC ......... 123/319, 330, 331, 351, 359, 360, 361, 123/399, 400, 403, 527
See application file for complete search history.

(56) References Cited

U.S. PATENT DOCUMENTS 3,596,642 A * 8/1971 Nakata ........................... 123/584
3,821,943 A * 7/1974 Toda et al. ..................... 123/327
4,536,356 A * 8/1985 Li ................................... 261/50.1

(Continued)

FOREIGN PATENT DOCUMENTS

CN 101438043 10/2012
JP 59-60355 U 4/1984

(Continued)

OTHER PUBLICATIONS

Office Action from China Intellectual Property Office for application CN201110154973.7 (Oct. 29, 2013).

(Continued)

*Primary Examiner* — Thomas Moulis
*Assistant Examiner* — Joseph Dallo
(74) *Attorney, Agent, or Firm* — Kilpatrick Townsend & Stockton LLP

(57) ABSTRACT

An engine includes: a carburetor configured to supply an air-fuel mixture of fuel and air; a crank case defining a crank chamber; a cylinder block which includes: a cylinder bore in which a reciprocable piston is disposed; and an intake port which supplies the air-fuel mixture supplied from the carburetor to the crank chamber; a control valve configured to open and close the intake port; and a controller configured to control the control valve. The controller controls the number of times that the control valve closes the intake port with respect to the number of times that the piston moves up to thereby reduce pressure of the crank chamber.

18 Claims, 13 Drawing Sheets

(56) References Cited

U.S. PATENT DOCUMENTS

| | | | | |
|---|---|---|---|---|
| 4,712,520 A | * | 12/1987 | Pasquin | 123/73 S |
| 4,724,811 A | * | 2/1988 | Maisch | 123/361 |
| 4,848,279 A | * | 7/1989 | Luo | 123/26 |
| 5,113,824 A | * | 5/1992 | Haubner | 123/399 |
| 5,287,835 A | * | 2/1994 | Fiorenza et al. | 123/352 |
| 5,732,682 A | * | 3/1998 | Petersson | 123/508 |
| 5,803,057 A | * | 9/1998 | Van de Brink | 123/527 |
| 6,935,308 B1 | * | 8/2005 | Nakamoto et al. | 123/395 |
| 6,994,057 B2 | * | 2/2006 | Loth et al. | 123/27 R |
| 7,213,550 B2 | * | 5/2007 | Nishida | 123/90.15 |
| 7,219,653 B2 | * | 5/2007 | Muraji | 123/399 |
| 2006/0086337 A1 | | 4/2006 | Nickel | |
| 2010/0011597 A1 | | 1/2010 | Bo et al. | |

FOREIGN PATENT DOCUMENTS

| | | | |
|---|---|---|---|
| JP | 03-005933 U | | 1/1991 |
| JP | 03253728 A | * | 11/1991 |
| JP | 07-253033 A | | 10/1995 |
| JP | 2006-118499 A | | 5/2006 |

OTHER PUBLICATIONS

Japan Patent Office office action for patent application JP 2010-130797 (Dec. 19, 2013).

Japan Patent Office office action for patent application JP2010-130796 (Mar. 4, 2014).

* cited by examiner

SMALL ENGINE AND ENGINE WORK MACHINE INCLUDING THE SAME

This application claims priority to Japanese Patent Applications Nos. P2010-130796, filed Jun. 8, 2010, and P2010-130797, filed Jun. 8, 2010, the disclosures of which are incorporated by reference herein.

BACKGROUND

The present invention relates to a small engine, and particularly, to a small engine suitable for portable engine work machines, such as a string trimmer and a chain saw, and an engine work machine including the same.

Two-cycle engines, for example, as shown in JP-A-7-253033, has a governor which cuts off an air-fuel mixture passage to prevent over-rotation of the engine in a case where the rotational frequency of the engine increases to a predetermined rotational frequency or higher.

Meanwhile, in the governor of JP-A-7-253033, an air-fuel mixture is not supplied in the case where the rotational frequency of the engine increases to a predetermined rotational frequency or higher. Thus, over-rotation is suppressed, and emission of unburned gas is also eliminated. However, since the governor does not operate at a predetermined rotational frequency or less, there is a problem in that unburned gas may be emitted to the outside in a case where combustion has not been performed within a cylinder.

SUMMARY

The invention has been made in view of the above problem, and the object thereof is to provide a small engine which can close an intake passage according to a rotational frequency, thereby suppressing emission of unburned gas, and an engine work machine comprising the same.

An aspect of the disclosure provides the following arrangements.

(1) An engine comprising:
a carburetor configured to supply an air-fuel mixture of fuel and air;
a crank case defining a crank chamber;
a cylinder block which includes:
a cylinder bore in which a reciprocable piston is disposed; and
an air-fuel mixture passage communicating the carburetor with a combustion chamber of the cylinder block to supply the air-fuel mixture from the carburetor to the combustion chamber,
a magnetic flux generator which includes a coil and is configured to generate a magnetic flux by applying a current to the coil; and
a control valve configured to close at least a part of the air-fuel mixture passage in response to the current applied to the coil.
(2) The engine according to (1), wherein
the magnetic flux generator is disposed at the vicinity of the intake port, and
the control valve has a magnetic property and is held at a close state in which the control valve closes at least the part of the intake port by the magnetic flux generated by the magnetic flux generator.
(3) The engine according to (2), wherein
if a pressure difference between pressure at the carburetor and pressure at the cylinder bore exceeds a predetermined value, the control valve is opened toward the cylinder bore and is held by being attracted by the magnetic flux generator in which the current is applied to the coil.
(4) The engine according to (2), wherein the control valve is a butterfly valve in which a rotational angle of the butterfly valve can be controlled by the current applied to the coil.
(5) The engine according to (1), wherein the air-fuel mixture passage includes an intake port which supplies the air-fuel mixture supplied from the carburetor to the crank chamber;
the control valve is configured to open and close a part of the intake port.
(6) The engine according to (5), wherein the magnetic flux generator is provided at an insulator disposed between the carburetor and the cylinder block.
(7) The engine according to (1) further comprising:
a signal output unit configured to output a signal synchronized with a rotational frequency of the engine; and
a controller configured to apply the current to the coil of the magnetic flux generator when the pressure difference exceeds the predetermined value based on the signal from the signal output unit.
(8) The engine according to (7), wherein
the controller apply the current to the coil when the rotational frequency of the engine exceeds a predetermined value based on the signal from the signal output unit.
(9) The engine according to (7) further comprising a throttle operating state detector configured to detect an operating state of a throttle, and
if the throttle operating state detector detects that the throttle is closed, the controller apply the current to the coil intermittedly.
(10) The engine according to (1), wherein the engine is a two-cycle engine.
(11) An engine work machine comprising the engine according to (1).
(12) An engine comprising:
a carburetor configured to supply an air-fuel mixture of fuel and air;
a crank case defining a crank chamber;
a cylinder block which includes:
a cylinder bore in which a reciprocable piston is disposed; and
an intake port which supplies the air-fuel mixture supplied from the carburetor to the crank chamber;
a control valve configured to open and close the intake port; and
a controller configured to control the control valve,
wherein the controller controls the number of times that the control valve closes the intake port with respect to the number of times that the piston moves up to thereby reduce pressure of the crank chamber.
(13) The engine according to (12) further comprising an operating state detector configured to detect an operating state of the engine including a rotational frequency of the engine,
wherein the controller controls the control valve based on the rotational frequency detected by the operating state detector.
(14) The engine according to (13),
wherein the predetermined value is a value such that the number of times that the intake control valve closes the intake port becomes smaller than the number of times that the piston moves up to thereby reduce the pressure of the crank chamber.
(15) The engine according to (14), wherein if the operating state detector detects the rotational frequency exceeding a first value, the controller changes the predetermined value based on the rotational frequency detected by the operating state detector such that the number of times that the intake control valve closes the intake passage while the intake opening is opened increases.

(16) The engine according to (12), wherein
the operating state detector includes an idling state detector configured to detect an idling state of the engine, and
if the operating state detector detects the rotational frequency exceeding a second value lower than the first value while the idling state detector detects the idling state, the controller changes the predetermined value on the basis of the rotational frequency detected by the operating state detector such that the number of times that the intake control valve closes the intake passage while the intake opening is opened increases.

(17) The engine according to (16), wherein
the operating state detector includes a throttle operating state detector configured to detect an operating state of a throttle, and
if the throttle operating state detector detects that the throttle is closed, the idling state detector detects an idling state of the engine.

(18) The engine according to (12), wherein the engine is a two-cycle engine.

(19) An engine work machine comprising the engine according to (12).

According to the aspect of the disclosure, the intake control valve is controlled on the basis of an engine rotational frequency such that the number of times that the intake passage closes while the intake opening is opened, with respect to the number of time that the intake opening opens, becomes a predetermined value. Thus, emission of unburned gas can be suppressed.

DESCRIPTION OF EXEMPLARY EMBODIMENTS

Figure 1:
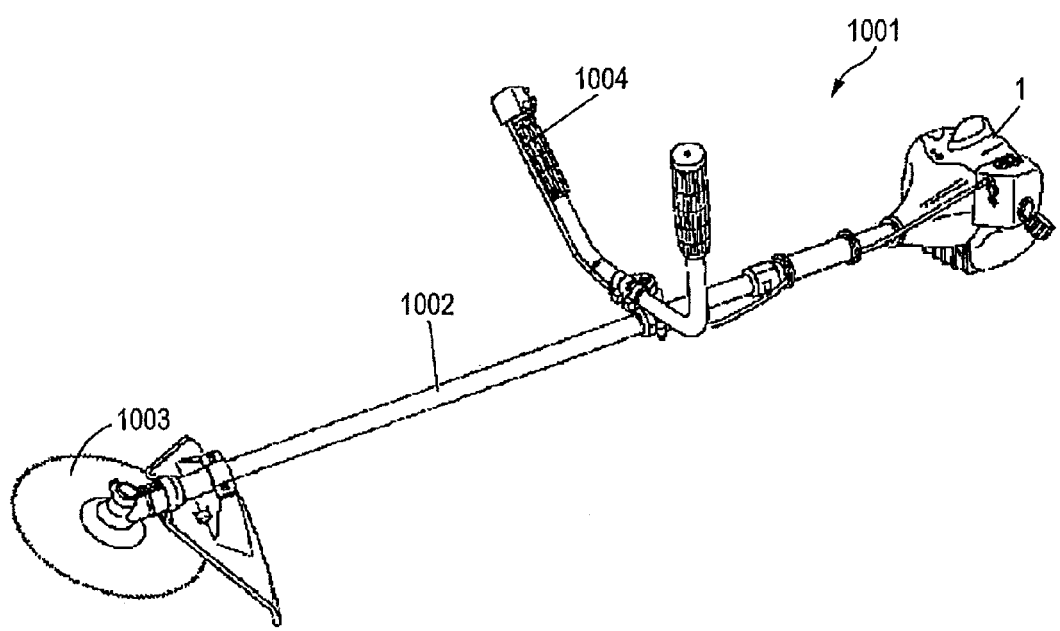
FIG. 1 is a perspective view of a string trimmer mounted with a small engine of the invention.

Hereinafter, an exemplary embodiment according to the invention will be described with reference to the accompanying FIGS. 1 to 13. As shown in FIG. 1, in a string trimmer 1001 mounted with a small two-cycle engine 1 (a small engine, hereinafter referred to as an "engine") which is suitable for mounting on a portable engine work machine, a rotary blade 1003 is attached to a tip of an operating rod 1002, and the engine 1 is attached to a rear end of the operating rod 1002. The output of the engine 1 is supplied to the rotary blade 1003 via a drive shaft inserted into the operating rod 1002. An operator grips a handle 1004 attached to the operating rod 1002, and operates the string trimmer 1001.

Figure 2:
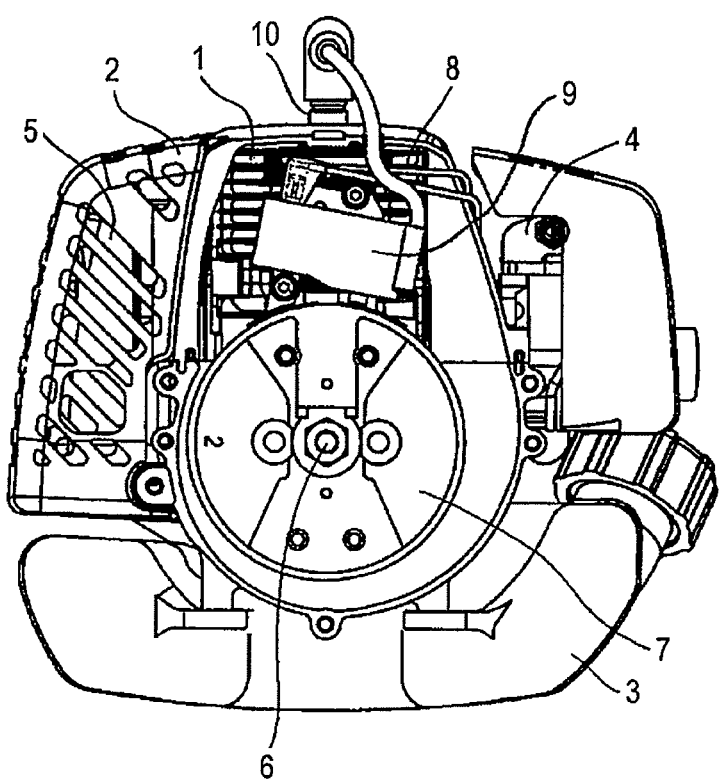
FIG. 2 is a side view as seen from the rear, showing a portion of the string trimmer of FIG. 1 in a cross-section.
Figure 3:
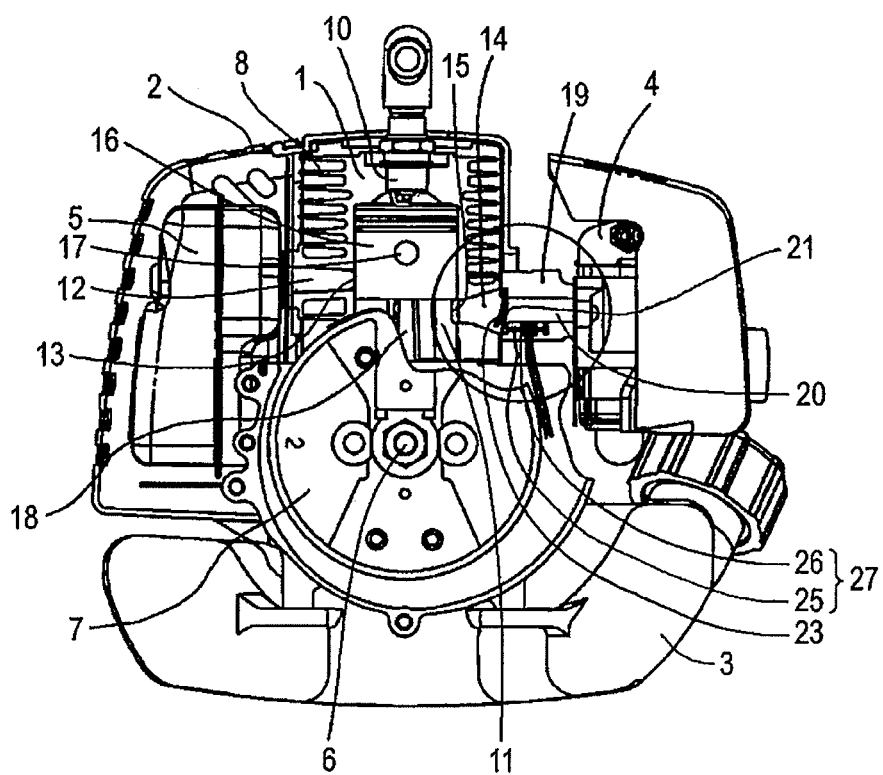
FIG. 3 is a view corresponding to FIG. 2, showing a small engine partially in a cross-section.

As shown in FIG. 2, a carburetor 4 which mixes the fuel supplied from a fuel tank 3 with air to supply an air-fuel mixture to the engine 1, a muffler 5, a magnet rotor 7 fixed to a crankshaft 6, an ignition coil 9 fixed to a cylinder block 8 of the engine 1, and an ignition plug 10 connected to the ignition coil 9 is attached to the engine 1 housed in an engine cover 2. As shown in FIG. 3, an exhaust opening 13 connected to an exhaust port 12, an intake opening 15 connected to an intake port 14, and a scavenging opening (not shown) connected to a scavenging passage (not shown) are open to an inner peripheral wall of a cylinder bore 11 formed inside the cylinder block 8. A piston 16 is stored within the cylinder bore 11 so as to be reciprocable in the up-and-down direction in the drawing. When the piston 16 moves up and down, the exhaust opening 13, the intake opening 15, and the scavenging opening are opened and closed by the side wall of the piston 16, respectively. In FIG. 3, the piston 16 is located at a top dead center, the exhaust opening 13 is in a closed state, and the intake opening 15 is in a completely opened state. The piston 16 is connected to the crankshaft 6 rotatably supported by a crank case (not shown) attached under the cylinder block 8 via a piston pin 17 and a connecting rod 18. The muffler 5 is connected to the cylinder block 8 so as to communicate with the exhaust port 12, and an insulator 19 is connected to the cylinder block such that the intake port 12 and an intake passage 20 of the insulator 19 communicate with each other. Further, the carburetor 4 is connected to the insulator 19.

Figure 4:
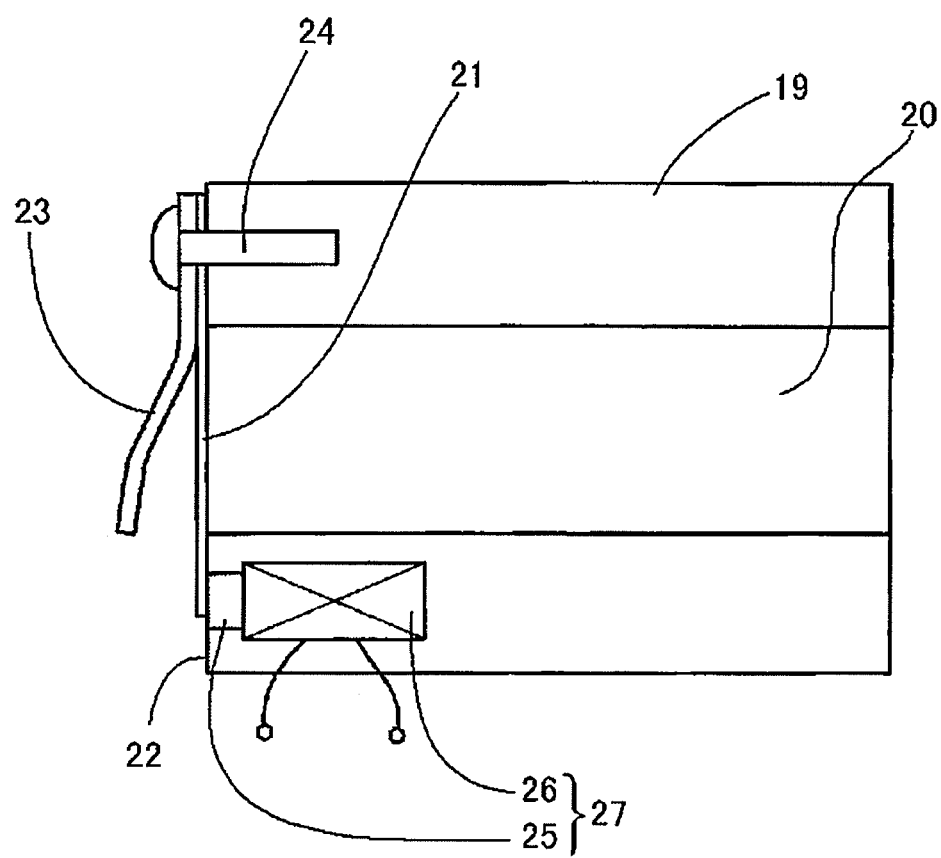
FIG. 4 is an enlarged cross-sectional view of an insulator portion of FIG. 3.
Figure 5:
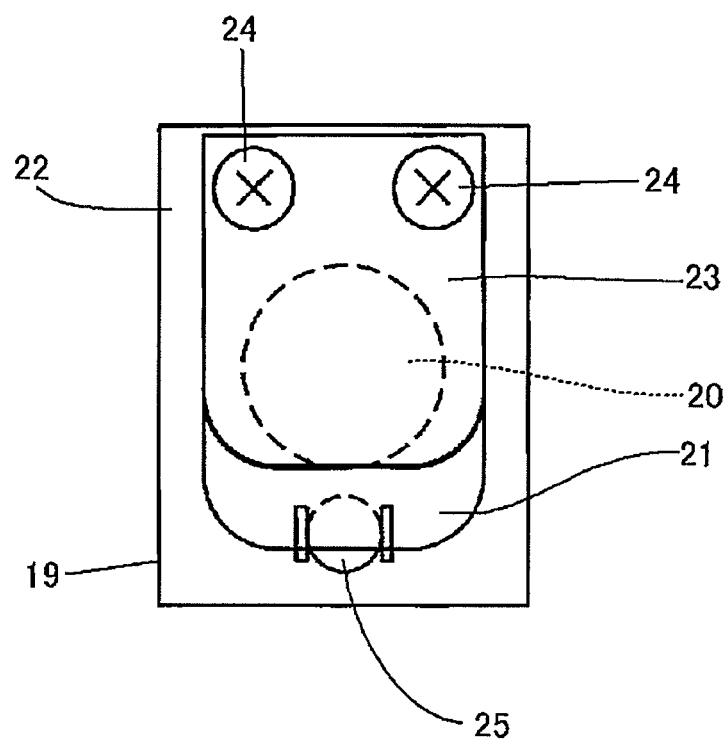
FIG. 5 is a front view of FIG. 4.
Figure 6:
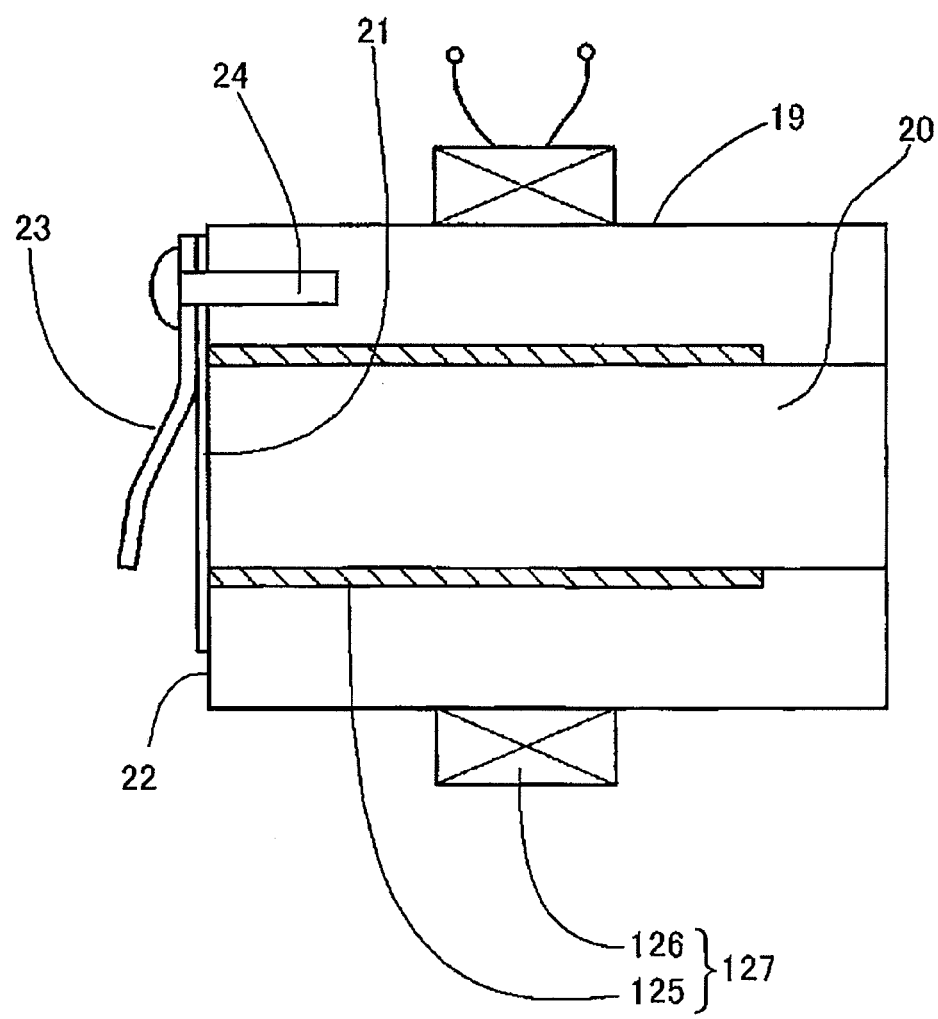
FIG. 6 is a view corresponding to FIG. 4, related to a modification of the insulator portion.

As shown in FIGS. 3 to 5, the end 22 of the insulator 19 on the side of the intake port 14 is provided with a reed valve (intake control valve) 21. The reed valve 21 is an elastically deformable plate-shaped magnetic body of stainless steel, bainite steel, or the like. The reed valve 21 is cantilevered at the end 22 of the insulator 19 on the side of the intake port 14 by a screw 24 along with a stopper 23 provided on the side of the intake port 14 of the reed valve 21 so as to completely cover the intake passage 20 of the insulator 19. The reed valve 21 is elastically deformed toward the intake port 14 and opens the intake passage 20 when the piston 16 moves up and the pressure differential between the inside of the crank chamber and the inside of the intake passage 20 exceeds a predetermined value (the inside of a crank chamber becomes a negative pressure). In a non-deformed state, the reed valve 21 covers the end of the intake passage 20 on the side of the intake port to close the intake passage 20. An electromagnet 27 including an iron core 25 and a coil 26 wound around the iron core 25 is provided at the free end of the reed valve 21 outside the intake passage 20 of the insulator 19, that is, on the side opposite to the screw 24 with the intake passage therebetween. When an electric current is applied to the coil 26 of the electromagnet 27, a magnetic flux is generated in the iron core 25, the electromagnet 27 attracts the reed valve 21 consisting of a magnetic body with an electromagnetic force, and the reed valve 21 is held in a state where the reed valve 21 closes the intake passage. Instead of the above-described electromagnet 27, as shown in FIG. 6, an electromagnet 127 including a tubular iron core 125 provided so as to cover a portion outside the intake passage 20 of the insulator 19, and an annular coil 126 so as to surround the iron core 125 outside the insulator 19 may be used.

Figure 7:
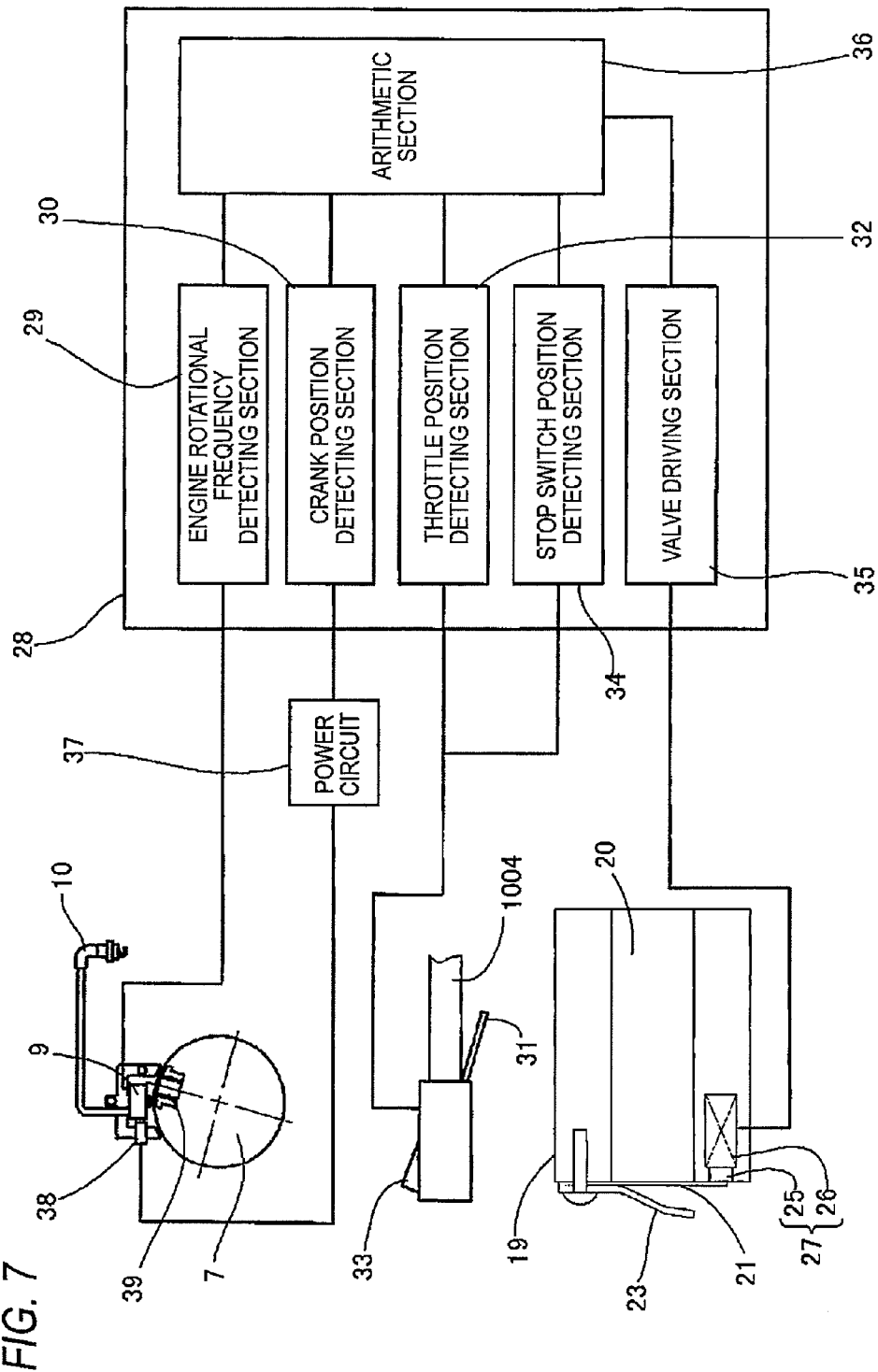
FIG. 7 is a control block diagram of the small engine related to the invention.

As shown in FIG. 7, a control device (controller) 28 used for the engine 1 includes a rotational frequency detecting section (operating state detector) 29 which detects the rotational frequency of the engine 1, a crank position detecting section (operating state detector) 30 which detects the position (crank angle or piston position) of the crankshaft 6 of the engine 1, a throttle position detecting section (an operation state detector, an idling state detector, or a throttle operation state detector) 32 which detects the position of a throttle lever 31 provided at the handle 1004, a stop switch position detecting section (operating state detector) 34 which detects the position of a stop switch 33 which stops the engine 1 provided at the handle 1004, a valve driving section 35 which performs application of an electric current to the coil 26, and an arithmetic section 36. The engine rotational frequency detecting section 29 detects a signal from the ignition coil 9 to detect the rotational frequency of the engine 1, and outputs a rotational frequency signal to the arithmetic section 36. The crank position detecting section 30 is connected to a power circuit 37, detects a predetermined position of the crank angle 6, for example, the position of a top dead center or at a position at a predetermined angle short of the top dead center, using a voltage pulse generated when a magnet 39 of a magnet rotor 7 passes through a charging coil 38 which supplies electric power to the power circuit 37, and outputs a crank position signal indicating the predetermined position of the crank shaft 6 to the arithmetic section 36 when the crank shaft 6 has passed the predetermined position. The crank position detecting section may be configured to detect the position of the crankshaft 6, using a voltage pulse generated in the ignition coil 9, instead of using the charging coil 38. The throttle position detecting section 32 detects whether or not the throttle lever 81 is operated, and outputs a throttle position signal to the arithmetic section 36, and the stop switch position detecting section 34 detects whether or not the stop switch 33 is operating (engine stop), and outputs a stop switch signal to the arithmetic section 36. Further, signals output from the engine rotational frequency detecting section 29, the crank position detecting section 30, the throttle position detecting section 32, and the stop switch position detecting section 34 are input to the arithmetic section 36, and a signal which drives the valve, that is, a signal which applies an electric current to the coil 26 and actuates the electromagnet 27, is output to the valve driving section 35.

Figure 8:
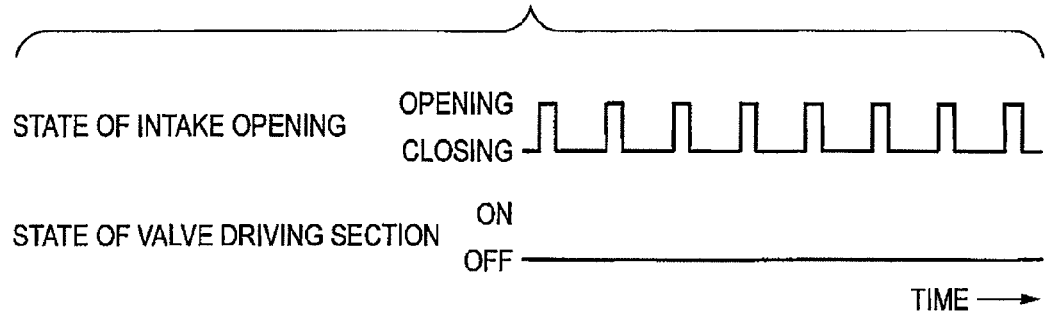
FIG. 8 is a timing chart showing the operation of an intake opening and a valve driving device.
Figure 9:
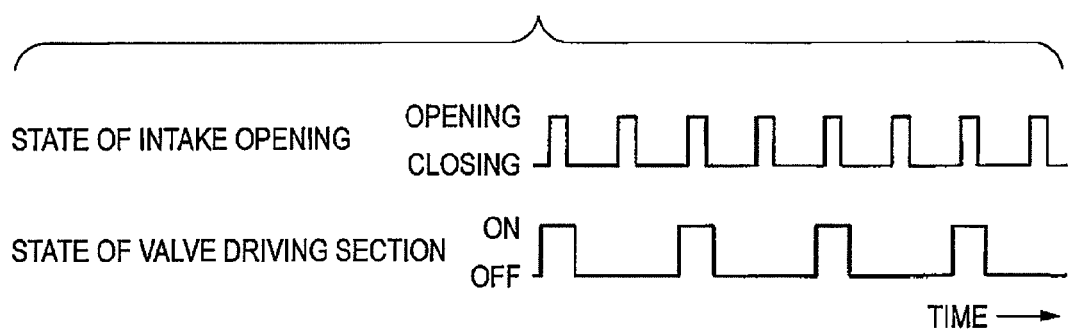
FIG. 9 is another timing chart showing the operation of the intake opening and the valve driving device.
Figure 10:
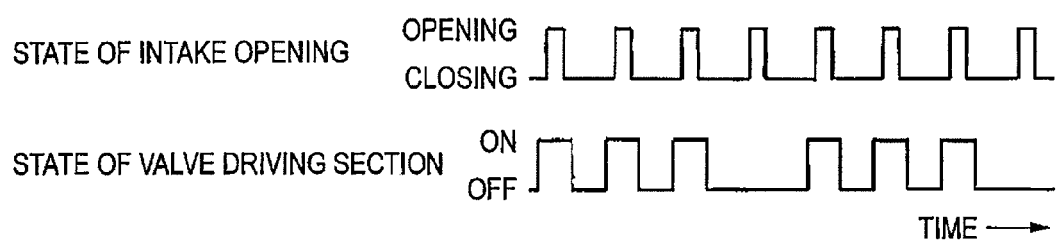
FIG. 10 is still another timing chart showing the operation of the intake opening and the valve driving device.

The control device 28 does not drive the valve driving section 35, as shown in FIG. 8, in a case where the throttle position detecting section 32 detects a state where the throttle valve 31 is not operated (a state where the throttle is closed), and the engine rotational frequency detecting section 29 detects that the rotational frequency of the engine 1 is equal to or less than an idling rotational frequency, for example, equal to or less than 3000 rpm. That is, in this state, the valve driving section 35 does not operate for the opening/closing (upper stage of the drawing) of the intake opening 15 accompanying the vertical movement of the piston, and the reed valve 21 is not held in the state of blocking the intake passage 20. In a case where the rotational frequency of the engine 1 increases from this state, and the engine rotational frequency detecting section 29 detects a first rotational frequency higher than the idling rotational frequency, for example, a rotational frequency exceeding 3500 rpm, that is, in a case where the throttle position detecting section 32 detects a state where the throttle lever 31 is not operated (a state where the throttle is closed), and the engine rotational frequency detecting section 29 detects a rotational frequency exceeding the first rotational frequency, the control device 28 drives the valve driving section 35 as shown in FIG. 9, in accordance with the timing when the intake opening 15 is opened, on the basis of the crank position signal of the crank position detecting section 30 and the engine rotational frequency signal of the engine rotational frequency detecting section 29, such that the number of times by which the intake passage 20 is closed while the intake opening 15 is opened, to the number of times by which the intake opening 15 is opened, becomes a predetermined value of ½. Accordingly, in this state, the reed valve 21 is held in the state of blocking the intake passage 20 during the opening of the intake opening 15 by the operation of the valve driving section 35, in one half (½) of the number of times that the intake opening 15 opens and closes accompanying the vertical movement of the piston. It is preferable to actuate the valve driving section 35 earlier than the timing when the intake opening 15 is opened, thereby applying an electric current to attract the reed valve 21 to the electromagnet 27, during a state where the reed valve 21 closes the intake passage 20 (a state where the reed valve 21 is not deformed). Moreover, in a case where the rotational frequency of the engine 1 increases, and the engine rotational frequency detecting section 29 detects a second rotational frequency higher than the first rotational frequency, for example, a rotational frequency exceeding 3600 rpm, that is, in a case where the throttle position detecting section 32 detects a state where the throttle lever 31 is not operated (a state where the throttle is closed), and the engine rotational frequency detecting section 29 detects a rotational frequency exceeding the second rotational frequency, the control device 28 drives the valve driving section 35 as shown in FIG. 10, in accordance with the timing when the intake opening 15 is opened on the basis of the crank position signal of the crank position detecting section 30 and the engine rotational frequency signal of the engine rotational frequency detecting section 29, such that the number of times that the reed valve 21 closes the intake passage while the intake passage is opened, with respect to the number of times that the intake opening is opened, becomes another predetermined value of ¾ (the predetermined value is changed to ¾ from ½). Accordingly, in this state, the reed valve 21 is held in the state of blocking the intake passage 20 during the opening of the intake opening 15 by the operation of the valve driving section 35, in three quarters (¾) of the number of times that the intake opening 15 opens and closes accompanying the vertical movement of the piston. Even in this case, it is preferable to actuate the valve driving section 35 earlier than the timing when the intake opening 15 is opened, thereby applying an electric current to attract the reed valve 21 to the electromagnet 27, during a state where the reed valve 21 closes the intake passage 20 (a state where the reed valve 21 is not deformed).

Additionally, the control device 28 does not drive the valve driving section 35, as shown in FIG. 8, in a case where the throttle position detecting section 32 detects a state where the throttle valve 31 is not operated, and the engine rotational frequency detecting section 29 detects that the rotational frequency of the engine is equal to or less than a third rotational frequency, for example, equal to or less than 8000 rpm. That is, in this state, the valve driving section 35 does not operate for the opening/closing (upper stage of the drawing) of the intake opening 15 accompanying the vertical movement of the piston, and the reed valve 21 is not held in the state of blocking the intake passage 20. In a case where the rotational frequency of the engine 1 increases from this state, and the engine rotational frequency detecting section 29 detects a fourth rotational frequency higher than the third rotational frequency, for example, a rotational frequency exceeding 9000 rpm, that is, in a case where the engine rotational frequency detecting section 29 detects a rotational frequency exceeding the fourth rotational frequency, the control device 28 drives the valve driving section 35 as shown in FIG. 9, in accordance with the timing when the intake opening 15 is opened, on the basis of the crank position signal of the crank position detecting section 30 and the engine rotational frequency signal of the engine rotational frequency detecting section 29, such that the number of times that the intake passage 20 is closed while the intake opening 15 is opened, with respect to the number of times that the intake opening 15 is opened, becomes a predetermined value of ½. Accordingly, in this state, the reed valve 21 is held in the state of blocking the intake passage 20 during the opening of the intake opening 15 by the operation of the valve driving section 35, in one half (½) of the number of times that the intake opening 15 opens and closes accompanying the vertical movement of the piston. It is preferable to actuate the valve driving section 35 earlier than the timing when the intake opening 15 is opened, thereby applying an electric current to attract the reed valve 21 to the electromagnet 27, during a state where the reed valve 21 closes the intake passage 20 (a state where the reed valve 21 is not deformed). Moreover, in a case where the rotational frequency of the engine 1 increases, and the engine rotational frequency detecting section 29 detects a fifth rotational frequency higher than the fourth rotational frequency, for example, a rotational frequency exceeding 9100 rpm, that is, in a case where the engine rotational frequency detecting section 29 detects a rotational frequency exceeding the fifth rotational frequency, the control device 28 drives the valve driving section 35 as shown in FIG. 10, in accordance with the timing when the intake opening 15 is opened, on the basis of the crank position signal of the crank position detecting section 30 and the engine rotational frequency signal of the engine rotational frequency detecting section 29, such that the number of times that the reed valve 21 closes the intake passage while the intake passage is opened, with respect to the number of times that the intake opening is opened, becomes another predetermined value of ¾ (the predetermined value is changed to ¾ from ½). Accordingly, in this state, the reed valve 21 is held in the state of blocking the intake passage 20 during the opening of the intake opening 15 by the operation of the valve driving section 35, in three quarters (¾) of the number of times that the intake opening 15 opens and closes accompanying the vertical movement of the piston. Even in this case, it is preferable to actuate the valve driving section 35 earlier than the timing when the intake opening 1 is opened, thereby applying an electric current to attract the reed valve 21 to the electromagnet 27, during a state where the reed valve 21 closes the intake passage 20 (a state where the reed valve 21 is not deformed).

Moreover, when the stop switch position detecting section 34 detects the operating state (state where the engine 1 is stopped) of the stop switch 33, and the engine rotational frequency detecting section 29 detects a state where the engine 1 is rotating, the control device 28 drives the valve driving section 35 in accordance with the timing when the intake opening 15 is opened, in all the number of times that the intake opening 15 opens and closes accompanying the vertical movement of the piston, such that the intake passage 20 is always closed while the intake opening 15 is opened. In a case where the stop switch position detecting section 34 detects the operation of the stop switch 33 without detecting the rotation of the engine 1, a configuration may be adopted in which the valve driving section 35 is driven, for example, for a predetermined time, in accordance with the timing when the intake opening 15 is opened, such that the intake passage 20 is always closed while the intake opening 15 is opened.

According to the engine 1 configured in this way, in a case where the rotational frequency of the engine 1 increases during idling, for example exceeding 3500 rpm, the control device 28 first performs a control such that the reed valve 21 is held in the state of blocking the intake passage 20 during the opening of the intake opening 15 by the operation of the valve driving section 35, in one half (½) of the number of times that the intake opening 15 opens and closes. Thereby, it is possible to perform a control so as to limit supply of an air-fuel mixture to the crank chamber to suppress an increase in the rotational frequency of the engine 1, and so as to hold the idling rotational frequency of 3000 rpm. Also, in a case where the rotational frequency of the engine 1 exceeds 3500 rpm, the reed valve 21 is held in the state of blocking the intake passage 20 during the opening of the intake opening 15 by the operation of the valve driving section 35, in three fourths (¾) of the number of times that the intake opening 15 opens and closes. Thereby, it is possible to more effectively perform a control so as to limit supply of an air-fuel mixture to the crank chamber to further suppress an increase in the rotational frequency of the engine 1, and so as to hold the idling rotational frequency of 3000 rpm. Accordingly, it is possible to reliably maintain the idling state of the engine 1, and it is also possible to suppress an excessive increase of the idling rotational frequency and coupling of a centrifugal clutch, by the operation of a starting aid mechanism, such as idling-up immediately after starting. Moreover, in a case where the rotational frequency of the engine 1 increases during idling rotation, the control device 28 limits supply of an air-fuel mixture to the crank chamber in a stepwise manner, that is, so as to become intense according to a rotational frequency. Thus, it is possible to prevent an operator from experiencing discomfort, thereby improving operability, without an abrupt change in the driving state of the engine 1. Additionally, during an increase in the idling rotational frequency, supply of an air-fuel mixture is suppressed. Thus, it is possible to suppress emission of unburned gas, it is possible to realize low emission gas characteristics, and it is also possible to reduce fuel consumption.

Additionally, in a case where the rotational frequency of the engine 1 increases excessively during operation, for example exceeding 9000 rpm, the control device 28 first performs a control such that the reed valve 21 is held in the state of blocking the intake passage 20 during the opening of the intake opening 15 by the operation of the valve driving section 35, in one half (½) of the number of times that the intake opening 15. Thereby, it is possible to perform a control so as to limit supply of an air-fuel mixture to the crank chamber to suppress an increase in the rotational frequency of the engine 1, and such that the rotational frequency of the engine 1 becomes equal to or less than 9000 rpm. In a case where the rotational frequency of the engine 1 exceeds 9500 rpm, the reed valve 21 is held in the state of blocking the intake passage 20 during the opening of the intake opening 15 by the operation of the valve driving section 35, in three quarters (¾) of the number of times that the intake opening 15 opens and closes. Thereby, it is possible to more effectively perform a control so as to limit supply of an air-fuel mixture to the crank chamber to further suppress an increase in the rotational frequency of the engine 1, and so as to hold the idling rotational frequency of 9000 rpm. Accordingly, it is possible to reliably suppress over-rotation of the engine 1. Additionally, in a case where the rotational frequency of the engine 1 increases, the control device 28 limits supply of an air-fuel mixture to the crank chamber in a stepwise manner, that is, so as so as to become intense according to a rotational frequency. Thus, it is possible to prevent the operator from experiencing discomfort, thereby improving operability, without an abrupt change in the driving state of the engine 1. Moreover, the reed valve 21 is not held in the state of always blocking the intake passage 20 during the opening of the intake opening 15, but the reed valve 21 is opened by at least one fourth (¼) of the number of times that the intake opening 15 opens and closes, and an air-fuel mixture is supplied to the crank chamber. Accordingly, it is possible to supply an air-fuel mixture containing a lubricant to the inside of the crank chamber to perform lubrication of the inside of the crank chamber, and it is possible to suppress burn-out or the like of the engine 1. Additionally, during the operation of the engine, supply of an air-fuel mixture is suppressed. Thus, it is possible to suppress emission of an unburned gas, it is possible to realize low emission gas characteristics, and it is also possible to reduce fuel consumption.

Moreover, in a case where the engine is rotating irrespective of whether the stop switch 38 operates, the intake passage 20 is always closed by the reed valve 21 while the intake opening 15 is opened in accordance with the timing when the intake opening 15 is opened, in all the number of times that the intake opening 15 opens and closes accompanying the vertical movement of the piston. Accordingly, it is possible to stop the supply of extra air-fuel mixture to the engine 1, thereby suppressing emission of noxious emission gas components. It is possible to reduce fuel consumption, and it is also possible to effectively prevent run-on or back-fire.

Additionally, opening and closing of the intake passage 20 can be controlled by the reed valve 21 consisting of a magnetic body at the end 22 of the insulator 19 on the side of the intake port 14, and the electromagnet 27 which attracts the reed valve 21 to the outside of the intake passage 20 of the insulator 19. Accordingly, the structure becomes simple and can be made compact without a need to provide a driving mechanism outside the insulator 19, and assembling is simple and the cost of products can be controlled, without requiring a large space for installing an apparatus around the insulator 19 or the engine 1. Additionally, in a case where the crank chamber has a positive pressure, the reed valve 21 is in the state of closing the intake passage 20, and an electric current is applied to the reed valve 21 such that the reed valve 21 is not opened in a closed state before the intake opening 15 is opened. Thus, it is not necessary to draw the reed valve 21 separated from the electromagnet, and it is possible to suppress power consumption. Additionally, since the engine is a two-cycle engine, it is possible to control the opening and closing timing with a simple configuration which does not include intake and exhaust valves or the like.

Figure 11:
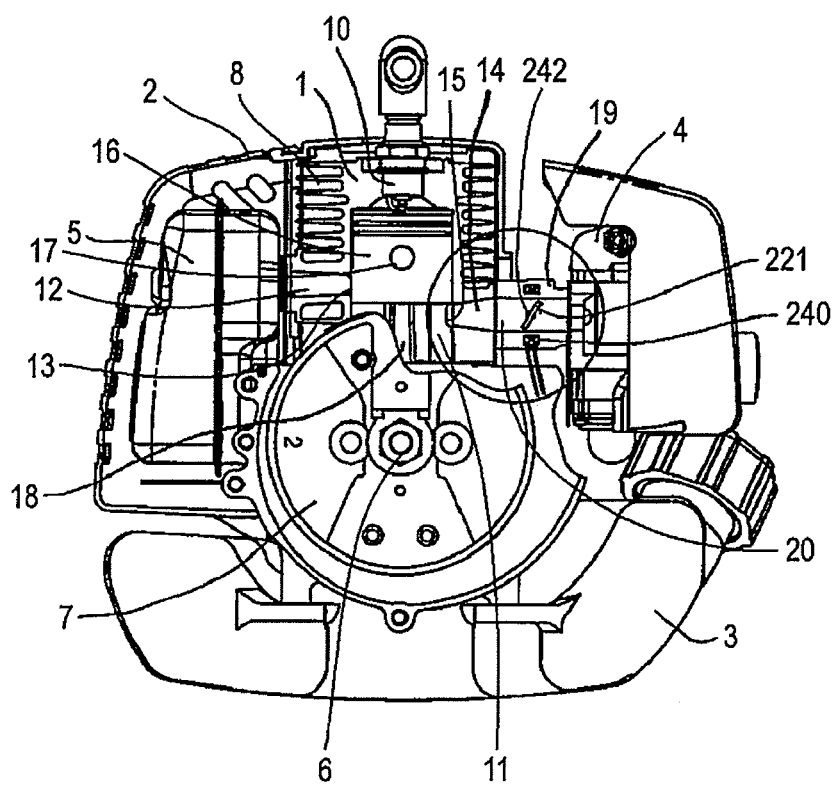
FIG. 11 is a view corresponding to FIG. 3 showing the modification of the invention.
Figure 12:
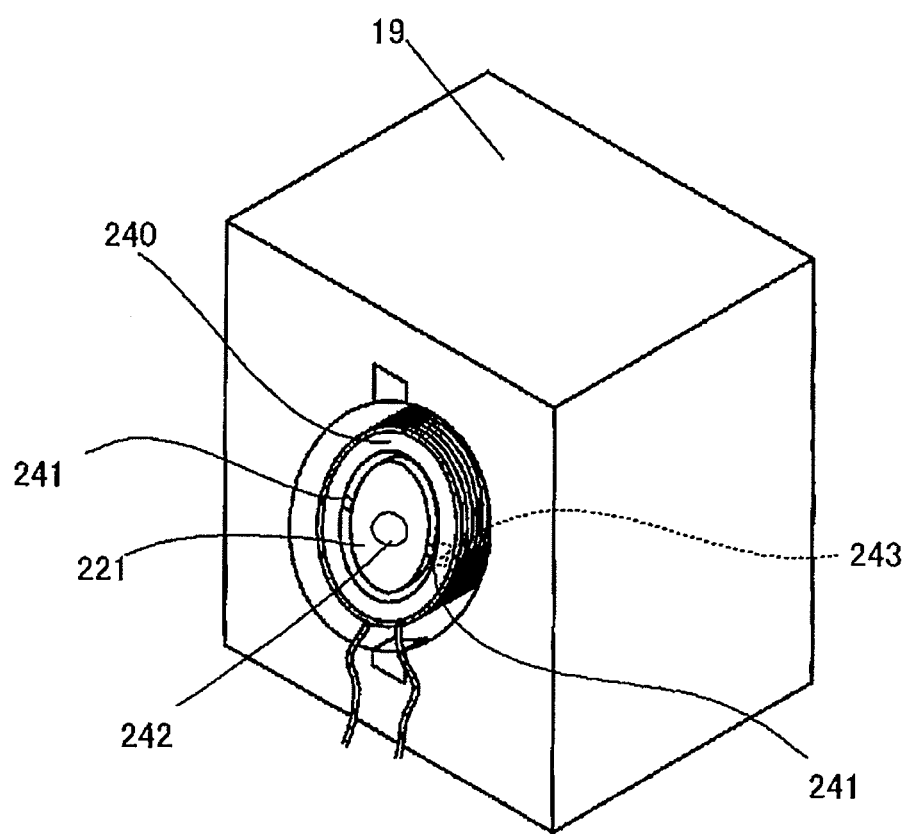
FIG. 12 is an enlarged perspective view in a state where the valve of the insulator portion of FIG. 11 is closed.
Figure 13:
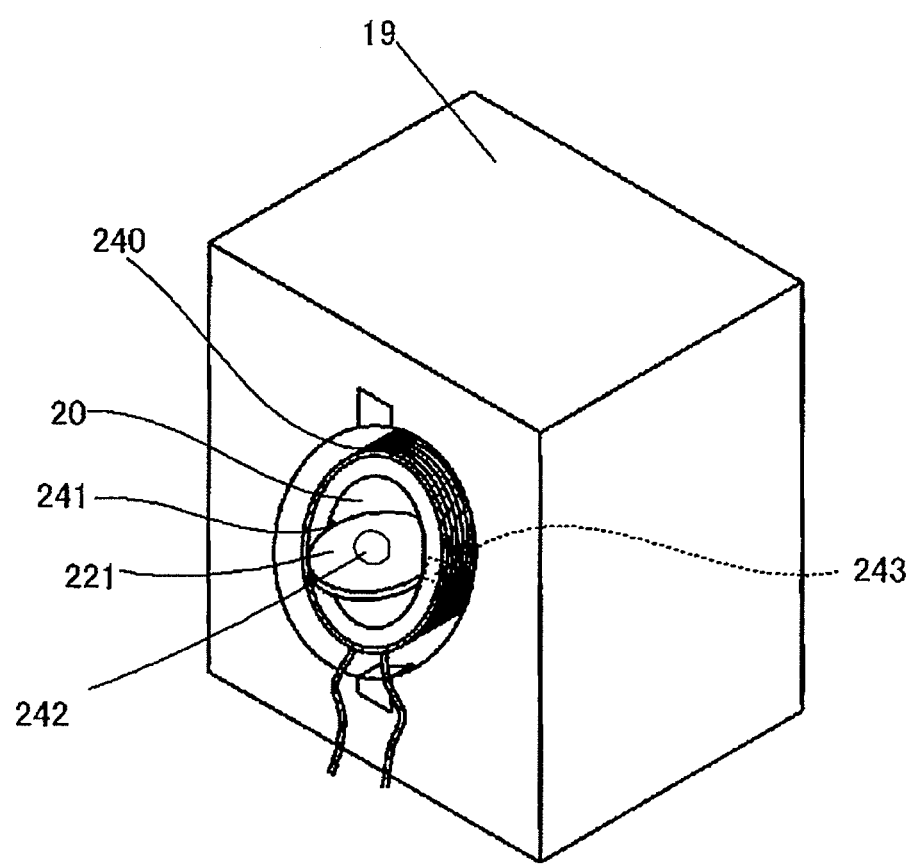
FIG. 13 is an enlarged perspective view in a state where the valve of the insulator portion of FIG. 11 is opened.

Instead of the configuration in which the intake passage 20 is opened and closed by the above-described reed valve 21, as shown in FIGS. 11 to 13, a configuration in which the intake passage is opened and closed by a butterfly valve (intake control valve) 221 may be adopted. In this case, a coil 226 annularly wound so as to surround the intake passage 20 is provided outside the intake passage 20 of the insulator 19, and the butterfly valve 221 turnably supported by a turning shaft 241 is provided inside the coil 226. The coil 226 is connected to the valve driving section 35 of the control device 28. Additionally, the butterfly valve 221 is provided with a magnet 242. Additionally, a connection portion between the turning shaft 241 and the coil 226 is provided with a spring member 243 which holds the butterfly valve 221 at an opened position. During application of an electric current to the coil 226, an electromagnetic force generated in the magnet 242 by a magnetic flux generated by the coil 226 is overcome by the force which holds the butterfly valve 221 at the opened position by the spring member 243, and the butterfly valve 221 is rotated around the turning shaft 241. Then, as shown in FIG. 12, the butterfly valve 221 is rotated such that the butterfly valve closes the intake passage 20. Additionally, when an electric current is not applied to the coil 226, the butterfly valve 221 is held at the opened position as shown in FIG. 13 by the spring member 243. The condition under which the butterfly valve 221 closes the intake passage 20 is the same as that of the above-described reed valve 21.

In this way, even in a case where the butterfly valve 221 is used, similarly to the reed valve 21, the structure becomes simple and can be made compact without a need to provide a driving mechanism outside the insulator 19, and assembling is simple and the cost of products can be controlled, without requiring a large space for installing an apparatus around the insulator 19 or the engine 1. In the case of the butterfly valve 221, for example, the control of controlling the rotational angle of the butterfly valve 221 to throttle the amount of intake in a case where the intake passage 20 is opened according to a rotational frequency may be added, in addition to simply controlling opening and closing of the intake passage 20. In this case, the control of the rotational frequency, for example, maintaining of the idling rotational frequency, and control of over-rotation are more effectively performed.

Control of the reed valve 21 or the butterfly valve 221 during idling or over-rotation is not limited to that performed in two steps as in the above-described embodiment. For example, the steps of the control may be increased to three steps or four steps or may be decreased to one step. Additionally, although the idling state detector is one which detects the position of the throttle lever, for example, the butterfly valve of the carburetor may be detected, and discrimination may be made by detecting whether or not the handle 1004 is gripped by an operator. Additionally, the number of times that the intake passage 20 closes, with respect to the number of times that the intake opening 15 opens and closes is not limited to the above-described example, and the number of times may be further increased or reduced. Additionally, although the invention is applied to a two-cycle engine in the present embodiment, the invention may be applied to a four-cycle engine. Furthermore, in the above-described embodiment, the engine 1 is mounted on the string trimmer 1001. However, the engine 1 is not limited to one mounted on the string trimmer 1001, and may be mounted on engine work machines, such as a chain saw, a blower, and a hedge trimmer.

In the above exemplary embodiments, the control valve (the reed valve 21 and the butterfly valve 221) is provided so as to open ad close the intake passage 20. However, the embodiment is not limited to this. For example, the control valve may be provided at a passage disposed between the crank chamber and a combustion chamber in the cylinder block. In other words, the control valve may be provided at any location where the control valve can control the supply of the air-fuel mixture supplied from the carburetor. That is, the control valve may be provided at an air-fuel mixture passage communicating the carburetor with a combustion chamber of the cylinder block to supply the air-fuel mixture from the carburetor to the combustion chamber, the air-fuel mixture passage including the intake port and the passage disposed between the crank chamber and a combustion chamber in the cylinder block.

In the above exemplary embodiments, the control valve is made of a magnetic body and the electromagnet is provided at the insulator. However, the embodiment is not limited to this.

For example, the control valve may be formed of the electromagnet and the magnetic body may be provided at the insulator.

What is claimed is:

1. An engine comprising:
 a carburetor configured to supply an air-fuel mixture of fuel and air;
 a crank case defining a crank chamber;
 a cylinder block including:
  a cylinder bore in which a reciprocable piston is disposed; and
  an air-fuel mixture passage communicating the carburetor with a combustion chamber of the cylinder block to supply the air-fuel mixture from the carburetor to the combustion chamber;
 a magnetic flux generator including a coil and being configured to generate a magnetic flux by applying a current to the coil, the application of the current to the coil starting when the pressure at the cylinder bore is equal to or greater than the pressure at the carburetor; and
 a reed valve configured to open the air-fuel mixture passage and close at least a part of the air-fuel mixture passage in response to the pressure difference between pressure at the carburetor and pressure at the cylinder bore and configured to maintain an at least partial closure of the air-fuel mixture passage while the current is applied to the coil.

2. The engine according to claim 1, wherein the reed valve comprises a magnetic material that directly interacts with the magnetic flux so as to maintain the at least partial closure of the air-fuel mixture passage.

3. The engine according to claim 2, wherein:
 if a pressure difference between pressure at the carburetor and pressure at the cylinder bore exceeds a predetermined value and the current is not applied to the coil, the reed valve bends toward the cylinder bore so as to open the air-fuel passage, and
 if the current is applied to the coil, the reed valve is prevented from bending towards the cylinder bore by being attracted by the magnetic flux.

4. The engine according to claim 1, wherein:
 the air-fuel mixture passage includes an intake port through which the air-fuel mixture is supplied from the carburetor to the crank chamber; and
 the reed valve is configured to open and close at least a part of the intake port.

5. The engine according to claim 4, wherein the magnetic flux generator is provided at an insulator disposed between the carburetor and the cylinder block.

6. The engine according to claim 3 further comprising:
 a signal output unit configured to output a signal synchronized with a rotational frequency of the engine; and
 a controller configured to apply the current to the coil of the magnetic flux generator when the pressure difference exceeds the predetermined value based on the signal from the signal output unit.

7. The engine according to claim 6, wherein the controller applies the current to the coil when the rotational frequency of the engine exceeds a predetermined value based on the signal from the signal output unit.

8. The engine according to claim 6 further comprising a throttle operating state detector configured to detect an operating state of a throttle, and
 if the throttle operating state detector detects that the throttle is closed, the controller applies the current to the coil intermittently.

9. The engine according to claim 1, wherein the engine is a two-cycle engine.

10. An engine work machine comprising the engine according to claim 1.

11. An engine comprising:
 a carburetor configured to supply an air-fuel mixture of fuel and air;
 a crank case defining a crank chamber;
 a cylinder block including:
  a cylinder bore in which a reciprocable piston is disposed; and
  an intake port through which the air-fuel mixture is supplied from the carburetor to the crank chamber;
 a reed valve configured to open and at least partially close the intake port in response to the pressure difference between pressure at the carburetor and pressure at the cylinder bore; and
 a controller configured to control the reed valve, the controller including a coil and being configured to generate a magnetic flux by applying a current to the coil, the magnetic flux causing the reed valve to maintain an at least partial closure of the intake port, the application of the current to the coil starting when the pressure at the cylinder bore is equal to or greater than the pressure at the carburetor,
 wherein the controller controls the number of times that the reed valve maintains an at least partial closure of the intake port with respect to the number of times that the piston moves up to thereby reduce pressure of the crank chamber.

12. The engine according to claim 11 further comprising an operating state detector configured to detect an operating state of the engine including a rotational frequency of the engine, wherein the controller controls the reed valve based on the rotational frequency detected by the operating state detector.

13. The engine according to claim 12, wherein the controller controls the number of times that the reed valve maintains an at least partial closure of the intake port with respect to the number of times that the piston moves up according to a predetermined value, wherein the predetermined value is a value such that the number of times that the intake reed valve maintains an at least partial closure of the intake port becomes smaller than the number of times that the piston moves up to thereby reduce the pressure of the crank chamber.

14. The engine according to claim 13, wherein if the operating state detector detects the rotational frequency exceeding a first value, the controller changes the predetermined value based on the rotational frequency detected by the operating state detector such that the number of times that the intake reed valve maintains an at least partial closure of the intake passage while the intake opening is opened increases.

15. The engine according to claim 14, wherein the operating state detector includes an idling state detector configured to detect an idling state of the engine, and if the operating state detector detects the rotational frequency exceeding a second value lower than the first value while the idling state detector detects the idling state, the controller changes the predetermined value on the basis of the rotational frequency detected by the operating state detector such that the number of times that the intake reed valve maintains an at least partial closure of the intake passage while the intake opening is opened increases.

16. The engine according to claim 15, wherein the operating state detector includes a throttle operating state detector configured to detect an operating state of a throttle, and if the throttle operating state detector detects that the throttle is closed, the idling state detector detects an idling state of the engine.

17. The engine according to claim 11, wherein the engine is a two-cycle engine.

18. An engine work machine comprising the engine according to claim 11.

* * * * *